(12) United States Patent
Lundy

(10) Patent No.: US 9,616,473 B2
(45) Date of Patent: Apr. 11, 2017

(54) IN-SITU SUBSURFACE EXTRACTION AND DECONTAMINATION

(71) Applicant: William L. Lundy, Oak Forest, IL (US)

(72) Inventor: William L. Lundy, Oak Forest, IL (US)

( * ) Notice: Subject to any disclaimer, the term of this patent is extended or adjusted under 35 U.S.C. 154(b) by 164 days.

(21) Appl. No.: 14/728,648

(22) Filed: Jun. 2, 2015

(65) Prior Publication Data

US 2015/0343503 A1 Dec. 3, 2015

Related U.S. Application Data

(60) Provisional application No. 62/006,721, filed on Jun. 2, 2014.

(51) Int. Cl.
*B09C 1/08* (2006.01)
*E02D 3/00* (2006.01)
*C09K 17/42* (2006.01)

(52) U.S. Cl.
CPC ............. *B09C 1/08* (2013.01); *C09K 17/42* (2013.01); *E02D 3/00* (2013.01); *B09C 2101/00* (2013.01)

(58) Field of Classification Search
CPC ...................................... B09C 1/08
USPC ..... 405/128.1, 128.15, 128.5, 128.7, 128.75, 405/129.2, 129.25, 263
See application file for complete search history.

(56) References Cited

U.S. PATENT DOCUMENTS

| 2002/0110509 A1* | 8/2002 | Lundy | B09C 1/002 423/143 |
| 2009/0087265 A1* | 4/2009 | Lundy | B09C 1/08 405/128.25 |
| 2012/0285891 A1* | 11/2012 | Lundy | B09C 1/002 210/668 |

* cited by examiner

*Primary Examiner* — Sunil Singh
(74) *Attorney, Agent, or Firm* — Greenberg Traurig, LLP

(57) ABSTRACT

A method of decontaminating ground media. The method includes drilling an injection hole into ground media to a depth at or below where contaminants are also present, drilling one or more extraction holes into the ground media in close proximity to the injection hole, injecting a reagent into the injection hole, treating the ground media for a time sufficient to have a chelating agent chelate a metal present in the ground media, reacting the chelated metal with a peroxide to produce hydroxide ions, contacting the reagent with the ground media to decrease its permeability, contacting contaminants in the ground media with the hydroxide ions to convert the contaminants to environmentally safe compounds, increasing the pressure of the reagent into the ground media, further reducing the permeability of the ground media to release trapped contaminants, and transferring contaminants from the ground media to above a surface of the ground media.

34 Claims, 1 Drawing Sheet

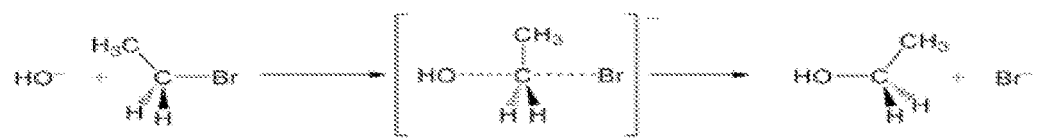

IN-SITU SUBSURFACE EXTRACTION AND DECONTAMINATION

BACKGROUND

1. Field of the Invention

The present invention relates to a method for in-situ extraction and chemical decontamination of contaminants in ground media comprising clayey materials.

2. Description of the Prior Art

Spills or accidents involving liquid contaminants being poured or dumped onto the ground can seep or leach the contaminants into the ground media. Depending on the specifics of the ground media, the contaminants generally settle in a layer of the ground media, co-mingled with soils, clayey materials or other ground media components. When possible, contaminants are removed through conventional drilling, pumping, displacing or other methods used to transfer liquid above the ground. Treating liquids that have already been extracted from the ground is generally considered to be much easier, and much less expensive, than attempting to remediate the contamination at the site, or in-situ. In many cases, however, contaminants cannot be separated from the ground media through these conventional processes. In such cases, in-situ treatment of the contaminants must be considered.

Conventional in-situ treatment technologies for cleaning contaminated subsurface media use injection ports or a combination of injection and extraction ports to deliver reagents and to extract reaction byproducts and contaminants. In-situ chemical oxidation or reduction requires the delivery of reagents in an aqueous medium. Following gravitation, the aqueous reagent solution administered to the subsurface through fixed injection ports becomes an integral part of the groundwater. The volume of contaminated subsurface media in the unsaturated zone above the groundwater table that is affected by the reagent solution is limited to the annular space of the injection ports. Within the groundwater, the reagent solution follows the natural or induced hydraulic gradient. The oxidizing and hydrophilic reagent solution follows preferred pathways, due to physical and chemical heterogeneities of subsurface media. Physical heterogeneities include variability in hydraulic conductivity caused by material changes, for example clay versus sand versus gravel soils versus fractured bedrock. Mineral surfaces are hydrophilic. The hydrophilic properties are altered by sorption of organic compounds such as natural soil organic matter and organic contaminants that contain both hydrophilic and hydrophobic moieties.

The physical constraints of conventional in-situ delivery systems and the physical chemical heterogeneities of ground media limit the effectiveness of oxidizing reagent solutions in making contact with contaminants. Moreover, the oxidizing reagents that are typically utilized in in-situ chemical oxidation systems, e.g. liquid hydrogen peroxide, sodium or potassium permanganate, sodium percarbonate, etc., can be unstable and/or short-lived.

Consumption of oxidant by matrix constituents typically exceeds the oxidant consumption by contaminants. To overcome these limitations, large volumes of highly concentrated reagent solutions are typically administered to the contaminated subsurface media. The introduction of highly concentrated and reactive solutions that contain non-specific oxidizing and/or reducing agents poses problems with respect to controlling the progress and the heat of these reactions.

In-situ oxidation systems are known that chemically oxidize organic contaminants to environmentally safe and non-toxic constituents. One such system is a reaction named after its discoverer, H. J. H. Fenton (1894). In this reaction, the oxidizing agent, hydrogen peroxide, is reacted with a metallic salt to generate free radicals with a higher oxidation potential than hydrogen peroxide. The free radicals react with organic compounds to either completely decompose them to carbon dioxide and water or to convert them to water soluble and biologically degradable compounds. A drawback to this process is that the catalytic decomposition of hydrogen peroxide and oxidation of organic compounds by radicals are both exothermic reactions.

A number of patents teach the art of treating contaminants with Fenton-type chemical systems in in-situ environments. The patents by Brown et al., U.S. Pat. No. 4,591,443, Vigneri, U.S. Pat. No. 5,520,483, Wilson, U.S. Pat. No. 5,611,642, Kelly et al., U.S. Pat. No. 5,610,065, and Cooper et al., U.S. Pat. No. 5,967,230, teach the introduction of liquid hydrogen peroxide and a metal catalyst, Fenton's Reagent, such as an iron salt, into the subsurface. Watts et al., U.S. Pat. No. 5,741,427, teaches the injection of a chelated metal catalyst for use in an in-situ chemical oxidation. All of the above-cited art adds a metal catalyst into the subsurface. In addition, the processes described in the above cited art include either the co-injection or the sequential introduction of reagents, where the oxidizing agent is added either before or after the metal catalyst. Finally, all of the above patents teach the necessity of introducing both the oxidizer and the metal catalyst together or separately into the subsurface to facilitate the oxidation of contaminants.

It should also be pointed out that the majority of sites are contaminated with multiple types of contaminants. Organic contaminants generally fall into several categories. These include contaminants composed of hydrogen and carbon atoms and are generally referred to as hydrocarbons. A second large cross section of contaminants is composed of hydrogen, carbon and halogen atoms and are known as halogenated compounds. This latter group of compounds is generally more recalcitrant than hydrocarbons.

Conventional methods of remediating halogenated compounds are the application of sodium or potassium permanganate, anaerobic reductive dechlorination and the application of nanoscale iron. While popular, these methods have serious complications that make them risky and generally require a long period of time if they are successful at all. Biological reductive dechlorination is dependent upon in-situ factors that will allow microbial proliferation. One of the most serious drawbacks to this technique is that it will not proceed where the concentrations of contaminants are in excess of the toxic threshold of the microbial community. Thus, it is not applicable to high concentrations of contaminants or conditions where free phase product is present. Similarly, although the application of nanoscale iron is not dependent upon biological factors, it is a solid suspension and, thus, extremely difficult if not impossible to inject in heavy soils such as hard clay. Therefore, the most popular method of application is trenching, which is expensive and requires the employment of heavy equipment and opening of the soil matrix, thereby exposing the contaminant to volatilization to the atmosphere. This practice can produce conditions unsafe for inhalation by site workers. Permanganate salts will successfully mitigate halogenated contaminants, but halogenated compounds are almost always co-contaminants of hydrocarbon compounds that cause permanganate to precipitate as manganese dioxide, thereby causing cessation of the oxidation reaction.

Furthermore, ground media comprising clayey materials presents additional challenges. Clayey materials (such as clay) may be relatively dense, in comparison to soil or silty materials. Clayey materials may also have both large and small passages, including a capillary-like pore structure that is generally not present in sand, soil or silty materials. While such pores allow the clayey material to hold liquids, including liquid contaminants, within them, such liquids are typically harder to remove from the ground media. The capillary pressure acts to retain liquid contaminants within them, while at the same time inhibiting contact between the contaminants and any fluid reagent which may be added. Furthermore, the size and multitude of the capillaries make it more difficult to reach the contaminants contained within them. Finally, a higher density ground media makes it more difficult to insert injection ports, or to drill, into the ground media for in-situ treatment—thus limiting the opportunities to contact the contaminants with a reagent.

OBJECTIVES OF THE INVENTION

The primary objective of various embodiments of the invention is to provide a method to remediate halogenated organic compounds that are present in ground media comprising clayey materials.

Another objective of various embodiments of the invention, and in many chemical processes today, is to reduce the emission of carbon dioxide ($CO_2$). $CO_2$ is a by-product of many oxidation processes. Chemical processes today aspire to emit as little waste or emissions as possible. While pollution control efforts have focused on solid and liquid wastes in the past, and on certain air pollutants that have been the subject of regulations, there has not been, until recently, any effort to curb $CO_2$ emissions. Not only does the emission of $CO_2$ transfer valuable carbon from the ground to the atmosphere, its continued emission has come under scrutiny as a gas that is quickly accumulating in the atmosphere at unprecedented levels.

Still another objective of various embodiments of the invention is to reduce the amount of reagent that is used to treat contaminants. While it is always optimal to be efficient in the use of reagent to minimize both cost and waste, the stoichiometric amounts of reagent required to react with large amounts of contaminants often dictate that equally large amounts of reagent must also be used. However, if such contaminants can be extracted from the ground in a manner other than reacting all of them, such a method would greatly reduce the amount of reagent that is required. The treatment of contaminants that have already been extracted from the ground is much more cost effective, with a greater number of means available for such treatment.

Yet another objective of various embodiments of the invention is the restoration of naturally-occurring solids to the ground. Limestone comprises mostly calcium carbonate ($CaCO_3$), and accounts for around 10% of all sedimentary rocks found throughout the world. Limestone is known to occur naturally in ground media. It is environmentally friendly, coexisting in nature with plant and animal life.

Thus, a conventional process does not exist that remediates halogenated organic contaminants in ground media comprising clayey materials with the application of a single solution that can extract contaminants from the ground media, react the contaminants to form environmentally-friendly non-toxic compounds, and can even restore naturally-occurring solids to the ground.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One aspect of the present invention is directed to a method of decontaminating ground media comprising clayey materials, halogenated organic contaminants and a metal compound. It includes the steps of (a) drilling an injection hole into the ground media comprising the metal compound, to a depth at or below where contaminants are also present; (b) drilling one or more extraction holes into the ground media in close proximity to the injection hole; (c) injecting a reagent into the injection hole at a flow rate and an initial pressure, the reagent comprising an alkaline aqueous solution having a pH of at least 7, the alkaline aqueous solution comprising a cation, a peroxide, and a chelating agent; (d) treating the ground media for a time sufficient to have the chelating agent chelate the metal of the metal compound present in the ground media; (e) reacting the chelated metal with the peroxide to catalytically convert the peroxide to oxidizing agents and hydroxide ions; (f) contacting the reagent with the ground media in an amount sufficient to decrease its permeability; (g) contacting the contaminants in the ground media with the hydroxide ions to convert the contaminants through nucleophilic substitution to environmentally safe, non-toxic compounds, comprising a gas (e.g., carbon dioxide); (h) increasing the pressure of the reagent into the ground media, to diffuse the reagent further into the ground media, and to generate additional reaction; (i) further reducing the permeability of the ground media, to release contaminants trapped therein; and (j) transferring contaminants from the ground media to above a surface of the ground media through pressure transfer.

Another aspect of the present invention is directed to a method of decontaminating ground media comprising clayey materials, halogenated organic contaminants and a metal compound. It includes the steps of (a) drilling an injection hole into the ground media comprising the metal compound, to a depth at or below where contaminants are also present; (b) injecting a reagent into the injection hole at a flow rate and an initial pressure, the reagent comprising an alkaline aqueous solution having a pH of at least 7, the alkaline aqueous solution comprising a cation, a peroxide, and a chelating agent; (c) treating the ground media for a time sufficient to have the chelating agent chelate the metal of the metal compound present in the ground media; (d) reacting the chelated metal with the peroxide to catalytically convert the peroxide to oxidizing agents and hydroxide ions; (e) contacting the reagent with the ground media in an amount sufficient to decrease its permeability; (f) contacting the contaminants in the ground media with the hydroxide ions to convert the contaminants through nucleophilic substitution to environmentally safe, non-toxic compounds, comprising a gas; (g) increasing the pressure of the reagent into the ground media, to diffuse the reagent further into the ground media, and to generate additional reaction; (h) further reducing the permeability of the ground media, to release contaminants trapped therein; and (i) contacting the contaminants in the ground media with one or more cations to convert gases to environmentally safe, non-toxic compounds, comprising a solid within the ground media.

Still another aspect of the present invention is directed to a method of decontaminating ground media comprising clayey materials, halogenated organic contaminants and a metal compound, and this method includes the steps of (a) drilling an injection hole into the ground media comprising the metal compound, to a depth at or below where contaminants are also present; (b) drilling one or more extraction holes into the ground media in close proximity to the injection hole; (c) injecting a reagent into the injection hole at a flow rate and an initial pressure, the reagent comprising an alkaline aqueous solution having a pH of at least 7, the alkaline aqueous solution comprising a cation, a peroxide, and a chelating agent; (d) treating the ground media for a time sufficient to have the chelating agent chelate the metal of the metal compound present in the ground media; (e) reacting the chelated metal with the peroxide to catalytically convert the peroxide to oxidizing agents and hydroxide ions; (f) contacting the reagent with the ground media in an amount sufficient to decrease its permeability; (g) contacting the contaminants in the ground media with the hydroxide ions to convert the contaminants through nucleophilic substitution to environmentally safe, non-toxic compounds, comprising a gas; (h) increasing the pressure of the reagent into the ground media, to diffuse the reagent further into the ground media, and to generate additional reaction; (i) further reducing the permeability of the ground media, to release contaminants trapped therein; (j) transferring contaminants from the ground media to above a surface of the ground media through pressure transfer; and (k) contacting the contaminants in the ground media with one or more cations to convert gases to environmentally safe, non-toxic compounds, comprising a solid within the ground media.

The term, "aqueous solution" as used herein and in the claims includes aqueous finely divided suspensions and slurries. In some embodiments, the pH of the alkaline aqueous solution in the present invention should be or should be adjusted to between 7.0 and 10.0.

In some embodiments, the metal compound in the present invention is iron, nickel and/or copper. In some embodiments, the cation may include one or more of the following: calcium, magnesium, sodium, potassium and boron. For instance, the cation is preferably calcium.

In some embodiments, the peroxide in the present invention includes one or more of the following: hydrogen peroxide, calcium peroxide, magnesium peroxide, sodium percarbonate and sodium perborate. The peroxide compound preferably includes a cation. The peroxide can react with water to produce hydrogen peroxide and hydroxide ions.

In some embodiments, the chelating agent is a water-soluble aminopolycarboxylate-chelating agent, desirably, an alkylenepolyamine polyarboxylate chelating agent. Useful chelating agents of this type are compounds such as ethylenediaminetetraacetic acid (EDTA), diethylenetriaminepentaacetic acid (DTPA), ethylenediamine-di(o-hydroxyphenylacetic acid (EDDHA) and polyaspartic acid (PASA). These compounds can be used alone or in combination.

In some embodiments, the oxidation agents are hydroxyl or perhydroxyl radicals. The oxidizing agents can react with organic compounds present in the ground media.

In some embodiments, the method of the present invention reduces the permeability of the ground media to a level sufficient to release contaminants trapped therein and/or to a level sufficient to substantially prevent the diffusion of gases (e.g., carbon dioxide). In some further embodiments, the ground media is maintained to a pH between 7.0 and 10.0 through the addition of a chelating agent.

In some embodiments, the gas is carbon dioxide.

In some embodiments, the solid includes calcium carbonate, magnesium carbonate, sodium carbonate, potassium carbonate, or bicarbonates thereof.

BRIEF DESCRIPTION OF THE DRAWING

The accompanying drawing, which is incorporated in and form a part of this specification, illustrates embodiments of the invention and, together with the description, serves to explain the principles of embodiments of the invention:

FIG. 1 is an example of a nucleophilic substitution reaction;

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and compounds have not been described in detail as not to unnecessarily obscure aspects of the present invention. While reference is often made to clay, or clayey materials below, the method of the present invention may be used with a variety of ground media, passages of which have a size and material to facilitate the production of solid carbonates, as described hereinbelow.

Generally speaking, various embodiments provide methods to treat soils and/or ground waters that are contaminated with halogenated organic compounds alone or in combination with other organic compounds. Some embodiments are used to extract contaminants from ground media, and others to treat the contaminants in-situ, to convert the contaminants to environmentally-non-toxic compounds, comprising solids. These methods may be used in combination with each other, and in fact enjoy a beneficial effect of being practiced simultaneously. Gases that are produced in the treatment of halogenated and other organic compounds may be utilized to deliver additional reagent to reach more contaminants, extract contaminants through pressure transfer, and to convert contaminants into solids such as calcium carbonate.

A method according to an embodiment of the present invention involves a nucleophilic substitution reaction whereby halogenated organic contaminants and other organic contaminants are chemically converted to environmentally friendly compounds, such as alcohols. Other organic contaminants are chemically oxidized by reaction with hydrogen peroxide and metallic peroxides in the presence of a metal catalyst. The method includes harnessing the abundance of metals in the ground media as source of the metal catalysts. The method may involve at least one and preferably a plurality of injection sites whereby a single aqueous reagent fluid is injected into the subsurface to facilitate the oxidation of contaminants. The term, "aqueous solution" as used herein and in the claims includes aqueous finely divided suspensions and slurries. The in-situ subsurface media affected by the present embodiment includes the subsurface unsaturated zone, the capillary fringe above the groundwater table, and the water-saturated zone, including clayey materials in the ground media.

In one embodiment of the invention, an aqueous oxidizing reagent formulation is delivered to an in-situ subsurface media, soil and groundwater contaminated with halogenated organic compounds. The formulation is comprised of liquid and solid peroxides, as well as polyaminopolycarboxylate chelates. The chelates in the reagent fluid extract naturally occurring metals from soil and bedrock as a source of metal catalysts necessary to convert the peroxides to oxidizing agents and hydroxide ions. The hydroxide ions convert the halogenated organic compounds to environmentally safe and non-toxic compounds through nucleophilic substitution. The oxidizing agents convert the other organic contaminants to (other) environmentally safe and non-toxic compounds. The methodology of successfully compounding chelating agents into the oxidizer reagent formulation obviates the need for a second formulation containing the metal catalysts. Because the method controls the activity of the chelates and the oxidizers, the rate of the oxidation reaction is controlled, thereby minimizing or eliminating the temperature rise produced by the current technologies. Also, the present embodiment minimizes any increase in the temperature of the ground media, and the volatilization of contaminants in the in situ proximity of the oxidation reaction is also minimized.

The contaminants converted by nucleophilic substitution include, but are not limited to, halogenated organic compounds, perchloroethylene, conventional chlorinated solvents, vinyl chloride, dichloroethene, polychlorinated biphenyls, halogenated herbicides and pesticides, dioxins, pentachlorophenol, ethylene dibromide, etc. The contaminants converted by chemical oxidation include, inter alia, aliphatic hydrocarbons, such as gasoline, diesel fuel, olefinic hydrocarbons, chlorinated and polychlorinated hydrocarbons, dry cleaning and industrial solvents, wood treating agents, herbicides, pesticides, polychlorinated biphenyls, aromatic and polynucleararomatic hydrocarbons, oxygenated hydrocarbons, phenol and phenol derivatives, nitrogenous hydrocarbons, or mixtures thereof. While halogenated compounds may be also be treated by oxidation, $S_N$ substitution is believed to be the predominant mechanism.

The peroxides that are administered to the subsurface media in an aqueous fluid include the peroxides, alone or in combination: hydrogen peroxide, magnesium peroxide, and calcium peroxide. The preferred chelates are exemplified by the water-soluable aminopolycarboxylate chelates ethylenediaminetetraacetic acid (EDTA), diethylenetriaminepentaacetic acid (DTPA), ethylenediamine-di(o-hydroxyphenylacetic acid) (EDDHA), and polyaspartic acid (PASA), their salts and/or combinations thereof. These chelating agents can also be used as the pH buffering agent, instead of or in combination with the phosphate buffering agents discussed above. Blends of chelating agents and peroxides may be used as well as single compounds of these groups of compounds.

The peroxide is present in the aqueous solution in an amount ranging from about 2 to about 11%. The pH of the solution of peroxide and chelating agent should be adjusted to at least 7.0. A beneficial range is pH between 7.0 and 10.0, preferably 7.5 to 9.5. The peroxides preferably used are calcium and hydrogen peroxides and blends thereof. A cation is further present in the alkaline aqueous solution, most often as part of one of the peroxide compounds. Calcium is the preferred cation, as it has been shown to have a dramatic effect in reducing the permeability of ground media comprising clayey materials, and tightening it, which is beneficial for both the extraction of contaminants, and the conversion of contaminants to environmentally-friendly solid compounds, as discussed in detail below. Other cations that may be used include magnesium, sodium, potassium, or boron (in the form of sodium perborate).

The aqueous solution of the peroxide and a water-soluble chelating agent, when adjusted to achieve the pH levels described, may require the presence of an alkaline buffering agent. While an additional buffering agent may be used, calcium peroxide has also been found to act additionally as a buffering agent. Other buffering agents that may be used include water-soluble phosphates, including alkali metal phosphates such as potassium phosphate, ammonium phosphate, urea phosphate, and combinations thereof. Preferred additional buffering agents are alkaline phosphate or ammonia phosphate salts and urea phosphate. Alternatively, the pH level may also be adjusted by adding additional quantities of chelating agents.

The peroxides are catalyzed with the metal present to form an oxidizing agent (hydroxyl radicals) and a hydroxyl ion. The hydroxyl ion is used in nucleophilic substitution to convert halogenated organic compounds to environmentally friendly chemicals such as alcohols. The oxidizing agent is used to oxidize organic compounds.

Phosphates as well as phosphoric acid and its salts are used to adjust the pH and to inhibit decomposition of hydrogen peroxide by free iron or other divalent metals, such as copper or nickel in the aqueous reagent fluid.

Various embodiments utilize the liquid hydrogen peroxide liberated by the dissolution of solid peroxides, such as calcium peroxide. In one embodiment, the preferred solid calcium peroxide employed in this invention react with water according to the following reactions:

$$CaO_2 + 2H_2O \rightarrow Ca^{+2} + 2(OH)^- + H_2O_2 \quad (1)$$

$$Fe^{+2} + H_2O_2 \rightarrow [OH]\cdot + (OH)^- \quad (2)$$

$$Fe^{+3} + H_2O_2 \rightarrow [OOH]\cdot + (OH)^- \quad (3)$$

The hydrogen peroxide that is gradually liberated in reaction (1) is available for catalytic decomposition. The hydroxides resulting from reaction (1), as well as the liquid hydrogen peroxide in the alkaline aqueous solution, dissociate reactions (2) and (3), thereby raising the pH of the solution. The calcium peroxides and/or phosphates added to the solution moderate the pH drift. The pH drifts to basic conditions. Basic pHs facilitate the dissolution of suspended EDTA, DTPA, EDDHA and PASA solids.

In a preferred embodiment of the invention, the reagent fluid is comprised of water, the peroxides hydrogen peroxide and calcium peroxide, and the aminopolycarboxylate chelates ethylenediaminetetraacetic acid (EDTA), diethylenetriaminepentaacetic acid (DTPA), ethylenediamine-di(o-hydroxyphenylacetic acid) (EDDHA), polyaspartic acid (PASA) and their salts and combinations thereof, and are injected into ground media. The proportions of aminopolycarboxylate chelates are determined based on site-specific leachability of calcium, magnesium, iron, nickel, and copper naturally occurring in the ground media, groundwater alkalinity, and ground pH. The concentration of total aminopolycarboxylate chelate employed typically ranges from about 0.03 Moles/Liter to about 3.25 Moles/Liter of reagent fluid, although more or less may be used for more extreme subsurface media conditions. The potential maximum molar concentration of hydrogen peroxide evolving from the dissolution of peroxide mixtures employed ranges from 0.6 Moles/Liter to 4.5 Moles/Liter of reagent fluid. The proportion of phosphate salts is contingent on site-specific pH of the groundwater and/or the buffering capacity of the ground media.

The Chelating Agents

The synthetic chelating agents that may employed in embodiments of the present invention include, but are not limited to, the aminopolycarboxylate chelates EDTA, DTPA, EDDHA and PASA. These agents form soluble complexes and chelates with free metal ions, such as divalent iron Fe(II), trivalent iron Fe(III), divalent copper Cu (II), divalent zinc Zn(II), divalent magnesium Mg(II) and divalent calcium Ca(II) in solution. The chelating agents dissociate exchangeable cations attached to mineral surfaces and also dissolve minerals. The iron-containing minerals that are dissolved by chelates include, inter alia, goethite, hematite, magnetite, ferrihydrite, and siderite.

A combination that gives good results is a blend of ethylienediaminetetraacetic acid with diethylenetriaminepentaacetic acid. These compounds have greater solubility in the form of their alkali metal or ammonia salts. The amount of chelating used typically is within the range of from about 0.03 to about 1.5 Moles/Liter.

The metal catalyst preferably is iron. Iron is almost universally present in nearly all soils and ground waters. The chelated iron is effective in the practice of the invention in either of its valence states, including mixtures thereof. Other catalytically active metal compounds, such as those of copper or nickel, if present in the soil, produce satisfactory results. It is, of course, understood that the metal compound present in the soil or groundwater must by capable of catalyzing the reactions described in its chelated form.

The effective complexation of the iron catalyst is strongly dependent on solution pH and the presence of Ca(II) and, to a lesser degree, Mg(II) (water hardness), which typically occurs at higher concentrations than Fe in natural waters. In an embodiment, the proportions of EDTA, DTPA, EDDHA and PASA employed depend upon the water hardness and the leachability of Ca(II), Mg(II), and Fe(II)/Fe(III) from soils and bedrock. Two solution conditions are known to decrease the stability of Fe-EDTA and Fe-DTPA, i.e., their tendency to form soluble Fe-chelates. In basic solutions, the solubility of iron is controlled by amorphous ferric iron hydroxide, which precipitates and diminishes the stability of Fe-EDTA and Fe-DTPA complexes. Calcium at high solution concentrations competes with iron for chelates Fe-DTPA, and more so, Fe-EDDHA. PASA chelates are less affected by these solution conditions than Fe-EDTA chelates.

Various embodiments utilize an oxidation reaction, where a chelated metal, preferably chelated iron, catalyzes the decomposition of hydrogen peroxide to yield hydroxyl, perhydroxyl, and superoxide radicals. As such, the reagent fluid should contain only an effective amount of chelation agent to avoid an excessive amount of catalyst from being produced that would cause an undesirable increase in the decomposition rate of the peroxide for safety and stability reasons. The soluble Fe-EDTA, Fe-DTPA, Fe-EDDHA and Fe-PASA chelates react with hydrogen peroxide to yield these highly reactive radicals, which, in turn, react with organic compounds.

The rate of oxidation reaction with Fe(II)-aminocarboxylate complexes, including Fe(II)-EDTA, Fe(II)-DTPA, Fe(II)-EDDHA and Fe(II)-PASA complexes, is greater by orders of magnitude than the rate of oxidation reaction with Fe-aquo complexes in solutions with near neutral pH. Fe(II) and Fe(III)-chelates are part of a cycle that decomposes hydrogen peroxide. Hydrogen peroxide oxidizes Fe(II)-chelate to Fe(III)-chelate and reduces Fe(III)-chelate to Fe(II)-chelate.

In aqueous Fenton-type oxidation systems, aliphatic and aromatic compounds and their halogenated derivatives undergo hydroxylation followed by mineralization. Fenton-type oxidation systems have been used to enhance the biological treatability of wastewater and landfill leachate containing various toxic and recalcitrant organic compounds. Fenton-type oxidation systems in soil decompose organic contaminants and also enhance their biological degradation in soil.

Nucleophilic Substitution of Halogens

One method used to produce synthetic alcohols involves the production of intermediate chlorinated carbon compounds. The primary feed stocks for this method of the production of alcohols are olefins and chlorine. Chlorine ($Cl_2$) is used to break the double bonds of olefins, thereby producing chloro-carbons. These chloro-carbons are then reacted using Nucleophilic Substitution ($S_N$) reactions ($S_N1$ or $S_N2$), wherein a hydroxide ion ($OH^-$) is substituted onto the carbon molecule thus, replacing the chloride ion ($Cl^-$) and forming alcohols. The alcohols are then purified and sold into the merchant market. Although popular prior to the 1970s, this process has been replaced by the direct catalytic oxidation of olefins under pressure.

In classical chemistry terms, the $S_N$ mechanisms are reduction reactions (not oxidation reactions as is popularly thought) whose reaction rate depends upon the concentration of the substrate (in an embodiment of the present invention, halogenated organic compounds) and the concentration of the hydroxide ion (OH—), and not the hydroxyl radicals ($[OH]°$ and/or $[OOH]°$) that are utilized in oxidation. In the treatment of halogenated contaminants, this mechanism circumvents the chemical oxidation mechanisms and thus, obviates the need for consideration of the effect of oxygen demand from Soil Oxygen Demand (SOD) or Natural Oxygen Demand (NOM) sources.

The $S_N$ reactions were first proposed by Christopher Ingold et al. in 1940. The $S_N1$ reaction is a substitution reaction in organic chemistry. "$S_N$" stands for nucleophilic substitution and the "1" represents the fact that the rate-determining step is unimolecular. The reaction involves a carbocation intermediate and is commonly seen in reactions of secondary or tertiary alkyl halides under basic conditions. With primary alkyl halides (chlorinated solvents or chloro-alkyl compounds), the alternative $S_N2$ reaction occurs. Among inorganic chemists, the $S_N1$ reaction is often known as the dissociative mechanism.

The $S_N2$ reaction is a type of nucleophilic substitution, where a lone electron pair from a nucleophile (hydroxide ion (OH—) attacks an electron deficient electrophilic (carbon atom) center and bonds to it, expelling another group called a leaving group (halide ion (Cl—)). Thus the incoming group replaces the leaving group in one step. Since two reacting species are involved in the slow, rate-determining step of the reaction, this leads to the name bimolecular nucleophilic substitution, or $S_N2$. Among inorganic chemists, the $S_N2$ reaction is often known as the interchange mechanism. Both these reaction mechanisms can occur under the varying conditions found under in-situ applications.

The reaction most often occurs at an aliphatic carbon center with an electronegative, stable leaving group attached to it—frequently a halide (Cl—) atom. The breaking of the carbon-chlorine C—(Cl—) bond and the formation of the new carbon-hydroxide C—(OH) bond occur simultaneously to form a transition state in which the carbon under nucleophilic (OH—) attack is hybridised. The nucleophile (OH—) attacks the carbon at 180° to the leaving group, since this provides the best overlap between the nucleophile's lone electron pair and the C—Cl—antibonding orbital. The leaving group (Cl—) is then pushed off the opposite side and the product (alcohol) is formed.

In the example of the $S_N2$ reaction depicted in FIG. 1, the attack of OH— (the nucleophile) on a bromoethane (the electrophile) results in ethanol, with bromide ejected as the leaving group. This is the classic example of the nucleophilic substitution reaction. This reaction is a negative free energy reaction and always proceeds to the right thus, producing an alcohol molecule and freeing the halogen ion. Because of this, the reaction is irreversible in nature.

When multiple halogen atoms are attached to a carbon molecule, the reaction proceeds until all halogen atoms have been replaced. Because of this, the reaction is irreversible in nature. When this occurs, the reaction products are usually carbon dioxide, water and halide ions. Thus, the $S_N$ reaction does not produce vinyl chloride or DCE, which are highly hazardous by-products of anaerobic dechlorination.

As described above, various embodiments of the present invention utilize an oxidation reaction, where a chelated metal, preferably chelated iron, catalyzes the decomposition of hydrogen peroxide to yield hydroxyl and perhydroxyl radicals, superoxide and hydroxide ions. The hydroxide ions are the key nucleophiles in a nucleophilic substitution reaction to convert halogenated organic compounds to alcohols, with the halogens converted to halide ions. The alcohols are highly biodegradable under aerobic conditions; the ultimate result of the process is the conversion of the halogenated organic compound to carbon dioxide. The halide ion is disbursed in the protic solvent (water).

It should be noted that $S_N$ reactions are dependent only on the concentrations of the substrate (chlorinated solvent) and the nucleophile (hydroxide ion). Oxygen demand considered critical under oxidation chemistry does not enter into this mechanism and, thus, is irrelevant to the success of this remedial process. It can, therefore, be concluded that, although the process produces hydroxyl radicals as well as hydroxide ions, the two functions are mutually exclusive. The hydroxyl radicals oxidize hydrocarbons by employing an addition reaction whereby the radical displaces a proton, thereby adding a hydroxide group to a carbon atom. The oxidation reactions produce an alcohol from a hydrocarbon substrate. Conversely, the $S_N$ reaction exploits the hydroxide ion $(OH)^-$ (the nucleophile) which displaces the halogen ion (Cr), thereby producing an alcohol from a chlorinated substrate. Both reactions are abiotic.

The rates of the oxidation reactions are controlled by two mechanisms. Because of the gradual dissolution of solid peroxides, the concentration of hydrogen peroxide in the subsurface media remains sufficiently low. The dissolution of the peroxides increases the pH, which, in turn, leads to the dissolution of the acidic chelates required for the formation of the chelated iron catalyst. The combined effect of the two mechanisms minimizes or eliminates the evolution of excessive heat from oxidation reactions. As such, the temperature of the ground water/subsurface media typically rises no more than 10.0 degrees F., preferably no more than 5.0 degrees F., most preferably, no more than 1.0 degree F.

Using this process, mixed plumes of contaminants (hydrocarbons and halogenated organic compounds) can be remediated at the same time by the same reagent applied by the same equipment from one injection point (in-situ application).

The reactions described above cause mild off-gassing of carbon dioxide and, in some cases, oxygen. The off-gassing is useful to pressurize the ground media, to extract the contaminants, or to convert the contaminants into environmentally-friendly, non-toxic solid compounds, as described below.

Application to the Ground Media Comprising Clayey Materials

The method according to an embodiment injects a single reagent fluid that contains all of the reagent compounds required for chemical oxidation of contaminants, or for generation of gases to cause pressure transfer of contaminants from the ground media. At least one injection and, preferably, a plurality of closely spaced injections, is/are made within the contaminated subsurface ground media to increase the probability of contact between the reagent and the contaminant. The in-situ environment in which the fluid is administered includes, separately or in combination, contaminants and clayey materials. The contaminants may be located solely within a layer of the ground media. The preferred embodiment treats subsets of the entire contaminated volume by administering small volumes of reagent fluid in a plurality of injection points, injected within or just below the contamination in the ground media. This application methodology allows the treatment of subsets with fluid volumes sufficient to wet the media, and in particular, where contaminants are located.

In the above-described steps and their preferred embodiments, the aqueous solutions are injected into at least one location, preferably multiple locations. In addition, holes may be drilled nearby the injection sites, at 5-10 foot intervals, in a radial formation. These holes, called extraction wells, are created to extract contaminants that are trapped within the ground media, which may be transferred out through pressure transfer. An injection hole is drilled below the surface of the ground media, to different depths spanning the contamination layer, having an upper level of contamination and a lower level of contamination. Preferably, the injection hole is drilled to depths below the contamination layer. Extraction wells are drilled nearby the injection hole, to a depth of about the middle of contamination layer. Above the surface, extraction holes are connected using one or more flexible hoses, to one or more receptacles, such as tanks, to receive contaminants that are extracted from the ground, via the extraction wells. Before the addition of reagent, the ground media is believed to have contaminants held within narrow diameter channels of the clayey materials in the ground media.

Ground media is injected with reagent at high pressure, 50 psi or more. During the injection, for the reasons described below, the pressure of the reagent must be increased to continue its flow. Reagent is injected into the ground media up to 300 psi or more.

Once the ground media is injected with reagent, the cation (calcium in the preferred embodiment) present in the alkaline aqueous solution is chelated with the chelating agent, to hold the cation in solution. Reagent is injected through one or more injection holes into the ground media, within the contamination layer, below the lower level of contamination and ascending to the upper level of contamination.

After being injected, the reagent reacts with contaminants contained within the ground media, producing $CO_2$ as a by-product of the reaction described above. The appearance of $CO_2$ acts to pressurize the passages within the clayey material, which are believed to be small in diameter, having a capillary-like structure. The additional pressure works to permeate the mixture of reagent, contaminants, and $CO_2$ byproduct further into the contaminant layer. This causes more reagent to reach more passages, and thus more contaminants. Under the increased pressure within the ground media, the $CO_2$ byproduct of the $S_N2$ reaction described above is believed to continue to react with the cation and hydroxide ions to precipitate solid compounds, including calcium carbonate, magnesium carbonate, sodium carbonate, potassium carbonate, and/or bicarbonates thereof, according to the following reaction:

$$Ca^{+2} + 2(OH)^- + CO_2 \rightarrow CaCO_3 + H_2O \quad (4)$$

The above reaction is not known to occur in conditions where the $CO_2$ may vent to the atmosphere. However, under the increased pressure of $CO_2$ produced from the reaction of contaminants, it is believed the $CO_2$ becomes saturated in the solution to an extent that it is available for reaction as described above. Furthermore, the conditions of the ground media are believed to facilitate the reaction described above. The capillary-like structures within the clayey material allows high pressure areas to form very quickly. Also, the internal surface of the ground media is believed to act like a catalyst, facilitating the reaction towards production of the carbonate solid. While calcium is shown in the reaction above, it may also occur with other cations as well, including magnesium, sodium, potassium and iron.

As solid carbonates are formed as a result of the reaction, the narrow passages within the ground media quickly become blocked. As the liquid contaminants in the passages react, the passages become solid with carbonates, thereby limiting the capacity of the ground media to transport any fluids—liquids or gases. As the ground media becomes pressurized with $CO_2$ from the ongoing reaction of liquid contaminants, and its ability to contain the liquid contaminants lessens with its passages being blocked, the rapidly increasing pressure will seek out any other routes for the fluids ($CO_2$ and liquid contaminants) to escape, such as the extraction wells.

Thus, the increased pressure within the passages will direct the contaminants towards the relatively lower pressure areas of the extraction wells. The pressure differential between the pressurized passages and the extraction wells, whose pressure is open to the atmosphere at one end, will cause contaminants to be transferred from the contaminant layer to the extraction wells, where it will be collected in a receptacle, as described above. As the contaminants are extracted from the ground media, additional reagent is added at higher pressures through the one or more injection holes, to penetrate the reagent even further into the contamination layer, thus reaching more passages, and both reacting more contaminants and extracting them via pressure transfer. Alternating areas of injection and extraction wells are dilled throughout a contaminated area, such that an entire area may be treated according to this method. This process of increased-pressure injection is continued, until the pressure needed to inject more reagent becomes so great that continued addition of reagent is impracticable. Because of the limitations of commonly available process equipment, as well as the site-specific conditions of its clayey materials, this limit was found to be 300 psi. However, it should be appreciated that if it were cost effective to continue the addition at pressures higher than 300 psi, this process may be continued at higher pressures.

It is further believed that adding additional reagent into the contamination layer at increased pressures acts to transport the reagent, or at least the chelated calcium and hydroxide ions necessary to perpetuate the Fenton-type reaction described above, within the ground media, to places that are not connected to the extraction wells, or are no longer connected to the extraction wells, because such passages become blocked with the reaction to solid carbonates as described above. These places, referred to herein as pockets, may take the form of many different shapes, but are generally spaces within the ground media where fluid can no longer escape. The walls of these pockets are able to withstand a great amount of pressure, as the passages within the ground media surface of the pockets become blocked with solid carbonate. Thus, the surface of the pocket more resembles the carbonate rock, which has formed within it. These pockets are believed to have first been filled with liquid contaminants, which then came into contact with chelated calcium and hydroxide ions. This interaction is believed to have created $CO_2$ as a byproduct of the reactions with the halogenated organic contaminants described above.

Under the increased pressure within the pockets, the $CO_2$ byproduct of the $S_N2$ reaction described above is believed to continue to react with the cation and hydroxide ions to precipitate solid carbonates, as described in reaction (4) above. Like the passages described above, the pockets also have conditions to produce solid carbonates, including high pressures created from trapped $CO_2$, and surfaces surrounding the pocket, upon which deposits of carbonates are believed to occur.

Advantages of Various Embodiments of the Present Invention

Various embodiments of the present invention have a number of advantages over the prior art. They do not require long-term operation, maintenance, and monitoring. Certain exemplary methods utilize a single reagent fluid, unlike conventional technologies which instead use multiple reagent fluids. Various embodiments greatly increase the ability of the reagents to penetrate the media and contact the contaminant by controlling the rate at which the reagent generates the oxidizing and reducing components. A unique and important feature of this process with regard to the remediation of halogenated organic compounds, is that because the rate mechanism is driven by the concentration of substrate and the availability of hydroxide ion (nucleophile), it can directly destroy free phase halogenated compounds. These concentrations of contaminant are above the toxic threshold of microbes therefore, anaerobic dechlorination (biological treatment) is obviated.

Further, the application of a dilute aqueous reagent fluid greatly increases the safety of the technology. Various embodiments provide the ability to control the rate of the chemical reactions during treatment, thereby minimizing or eliminating the heat generated by conventional technologies, and thus assuring that contaminants are not volatilized during the treatment. Various embodiments also eliminate the need for pretreatment of the subsurface media with acid and/or a metal catalyst as is required by the current technology.

Further, the method according to an embodiment of this invention greatly conserves reagent, as much less than stoichiometric amounts of reagent are required to remove contaminants from the ground. Once removed from the ground, the contaminants can be treated using other methods that are known to cost less than in-situ treatment using the reagent described above.

Finally, another advantage of an embodiment of the invention, is the oxidation of contaminants with a minimal production of $CO_2$ byproduct. By producing environmentally-safe, non-toxic solid compounds such as calcium carbonate, the method minimizes emissions of $CO_2$. In its place, naturally-occurring solid compounds are produced in the ground, which have no negative effects upon the ground water, or the atmosphere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

Example 1

A site comprising mostly clay was contaminated with tetrachloroethylene (TCE) and Stoddard solvent within a layer located 20 to 25 feet below the ground surface (bgs). The maximum concentration of contaminants in the ground media was measured as Ser. No. 11/000,000 µg/kg (1.1%), the average contamination level was 6,200,000 µg/kg (0.62%). The temperature of the ground media was 50-55 degrees F. Holes were drilled in an approximately 30' diameter area known to contain the highest concentrations of contaminants. All but one of the holes were fitted with flexible hoses connected to tanks, to collect any contaminants. Reagent containing 4-7% $CaO_2$, 2-4% $H_2O_2$ and 2-4% EDTA was injected into the injection hole using a DPT probe at depths from fifteen (15) to seventy (70) feet bgs, to contact the contaminants. Additional holes were spaced at approximately seven (7) foot intervals from the injection hole. The method consisted of injecting reagent into the injection hole at a pressure of 50 psi. It was observed that at constant pressure, the flowrate of reagent started to drop. To compensate, the pressure was increased. Meanwhile, liquid started to flow out of the other holes into the tanks. The pressure had to be gradually increased to a maximum of 300 psi, after which no more reagent was injected into the ground. This procedure was repeated at different intervals between 15 and 70 feet bgs, beginning at the deepest level, and then raising the DPT probe every 1-2 feet before injecting again. During subsequent injections, the maximum pressure was reached more and more quickly. Furthermore, the ground media appeared to be harder, and more difficult in which to drill, after injecting reagent. Unlike previous experience with a similar reagent used to decontaminate halogenated contaminants in soils and silty materials, no gases were observed coming off of the surface.

After treatment was completed, a total of approximately 400 gal of liquid was collected in the tanks Approximately six months after treatment, a track hoe equipped with an Alpine Rotary horizontal rock grinder drilled at the injection site. The ground media, as suspected, was observed to be much harder, and denser, than before treatment. Furthermore, white solid deposits ranging in size from ½ inch to 1 foot in diameter within the ground media were observed at depths previously known to contain contaminants, and not previously observed or known to exist at the site. The solid nodules, and the clayey material surrounding the nodules, were each tested by an outside laboratory using x-ray diffraction analysis, the results of which are shown in Table 1 below. The concentration of contaminants post-treatment was measured as 147,000 µg/kg, representing a 97.6% removal of contaminants.

TABLE 1

| Mineral Constituents | Sample ID Chemical Formula | Nodules Relative Abundance (%) | Background Matrix Relative Abundance (%) |
|---|---|---|---|
| Quartz | $SiO_2$ | 14 | 15 |
| Plagioclase Feldspar - Albite | $(Na, Ca)AlSi_3O_8$ | 4 | 6 |
| K-Feldspar - Microcline | $KAlSi_3O_8$ | 3 | 4 |
| Calcite | $CaCO_3$ | 22 | 11 |
| Dolomite | $(Ca, Mg)(CO_3)_2$ | 18 | 35 |
| Hornblende | $Ca_2(Mg, Fe)_5(Si, Al)_8O_{22}(OH)_6$ | 0 | trace |
| Magnetite | $alpha-Fe_3O_4$ | 0 | trace |
| Portlandite | $Ca(OH)_2$ | 6 | 1 |
| Brucite | $Mg(OH)_2$ | 15 | 1 |
| Gypsum | $CaSO_4 \cdot 2H_2O$ | trC | 0 |
| Clay/Mica | | 13 | 19 |
| Amorphous | | 5 | 8 |
| TOTAL | | 100 | 100 |

What is claimed is:

1. A method of decontaminating ground media comprising clayey materials, halogenated organic contaminants and a metal compound, the method comprising:
    drilling an injection hole into the ground media comprising the metal compound, to a depth at or below where contaminants are also present;
    drilling one or more extraction holes into the ground media in close proximity to the injection hole;
    injecting a reagent into the injection hole at a flow rate and an initial pressure, the reagent comprising an alkaline aqueous solution having a pH of at least 7, the alkaline aqueous solution comprising a cation, a peroxide, and a chelating agent;
    treating the ground media for a time sufficient to have the chelating agent chelate the metal of the metal compound present in the ground media;
    reacting the chelated metal with the peroxide to catalytically convert the peroxide to oxidizing agents and hydroxide ions;
    contacting the reagent with the ground media in an amount sufficient to decrease its permeability;
    contacting the contaminants in the ground media with the hydroxide ions to convert the contaminants through nucleophilic substitution to environmentally safe, non-toxic compounds, comprising a gas;
    increasing the pressure of the reagent into the ground media, to diffuse the reagent further into the ground media, and to generate additional reaction;
    further reducing the permeability of the ground media, to release contaminants trapped therein; and
    transferring contaminants from the ground media to above a surface of the ground media through pressure transfer.

2. The method of claim 1, wherein the metal compound comprises iron, nickel and/or copper.

3. The method of claim 1, wherein the pH of the alkaline aqueous solution is between 7.0 and 10.0.

4. The method of claim 1, wherein the cation comprises one or more of the following: calcium, magnesium, sodium, potassium and boron.

5. The method of claim 4, wherein the cation is calcium.

6. The method of claim 1, wherein the peroxide comprises one or more of the following: hydrogen peroxide, calcium peroxide, magnesium peroxide, sodium percarbonate and sodium perborate.

7. The method of claim 1, wherein the peroxide compound comprises a cation.

8. The method of claim 1, wherein the peroxide reacts with water to produce hydrogen peroxide and hydroxide ions.

9. The method of claim 1, wherein the chelating agent is a water-soluble aminopolycarboxylate-chelating agent.

10. The method of claim 9, wherein the water-soluble aminopolycarboxylate-chelating agent comprises one or more of the following: ethylenediaminetetraacetic acid (EDTA), diethylenetriaminepentaacetic acid (DTPA), ethylenediamine-di(o-hydroxyphenyl)acetic acid (EDDHA) and polyaspartic acid (PASA).

11. The method of claim 1, wherein the oxidation agents are hydroxyl or perhydroxyl radicals.

12. The method of claim 1, wherein the permeability of the ground media is reduced to a level sufficient to release contaminants trapped therein.

13. The method of claim 1, wherein the permeability of the ground media is reduced to a level sufficient to substantially prevent the diffusion of gases.

14. The method of claim 1, wherein the ground media is maintained to a pH between 7.0 and 10.0 through the addition of a chelating agent.

15. The method of claim 1, wherein the oxidizing agents react with organic compounds present in the ground media.

16. The method of claim 1, wherein the gas comprises carbon dioxide.

17. A method of decontaminating ground media comprising clayey materials, halogenated organic contaminants and a metal compound, the method comprising:
   drilling an injection hole into the ground media comprising the metal compound, to a depth at or below where contaminants are also present;
   injecting a reagent into the injection hole at a flow rate and an initial pressure, the reagent comprising an alkaline aqueous solution having a pH of at least 7, the alkaline aqueous solution comprising a cation, a peroxide, and a chelating agent;
   treating the ground media for a time sufficient to have the chelating agent chelate the metal of the metal compound present in the ground media;
   reacting the chelated metal with the peroxide to catalytically convert the peroxide to oxidizing agents and hydroxide ions;
   contacting the reagent with the ground media in an amount sufficient to decrease its permeability;
   contacting the contaminants in the ground media with the hydroxide ions to convert the contaminants through nucleophilic substitution to environmentally safe, non-toxic compounds, comprising a gas;
   increasing the pressure of the reagent into the ground media, to diffuse the reagent further into the ground media, and to generate additional reaction;
   further reducing the permeability of the ground media, to release contaminants trapped therein; and
   contacting the contaminants in the ground media with one or more cations to convert gases to environmentally safe, non-toxic compounds, comprising a solid within the ground media.

18. The method of claim 17, wherein the metal compound comprises iron, nickel and/or copper.

19. The method of claim 17, wherein the pH of the alkaline aqueous solution is between 7.0 and 10.0.

20. The method of claim 17, wherein the cation comprises one or more of the following: calcium, magnesium, sodium, potassium and boron.

21. The method of claim 20, wherein the cation is calcium.

22. The method of claim 17, wherein the peroxide comprises one or more of the following: hydrogen peroxide, calcium peroxide, magnesium peroxide, sodium percarbonate and sodium perborate.

23. The method of claim 17, wherein the peroxide compound comprises a cation.

24. The method of claim 17, wherein the peroxide reacts with water to produce hydrogen peroxide and hydroxide ions.

25. The method of claim 17, wherein the chelating agent is a water-soluble aminopolycarboxylate-chelating agent.

26. The method of claim 25, wherein the water-soluble aminopolycarboxylate-chelating agent comprises one or more of the following: ethylenediaminetetraacetic acid (EDTA), diethylenetriaminepentaacetic acid (DTPA), ethylenediamine-di(o-hydroxyphenyl)acetic acid (EDDHA) and polyaspartic acid (PASA).

27. The method of claim 17, wherein the oxidation agents are hydroxyl or perhydroxyl radicals.

28. The method of claim 17, wherein the permeability of the ground media is reduced to a level sufficient to release contaminants trapped therein.

29. The method of claim 17, wherein the permeability of the ground media is reduced to a level sufficient to substantially prevent the diffusion of gases.

30. The method of claim 17, wherein the ground media is maintained to a pH between 7.0 and 10.0 through the addition of a chelating agent.

31. The method of claim 17, wherein the oxidizing agents react with organic compounds present in the ground media.

32. The method of claim 17, wherein the gas comprises carbon dioxide.

33. The method of claim 17, wherein the solid comprises calcium carbonate, magnesium carbonate, sodium carbonate, potassium carbonate, or bicarbonates thereof.

34. A method of decontaminating ground media comprising clayey materials, halogenated organic contaminants and a metal compound, the method comprising:
   drilling an injection hole into the ground media comprising the metal compound, to a depth at or below where contaminants are also present;
   drilling one or more extraction holes into the ground media in close proximity to the injection hole;
   injecting a reagent into the injection hole at a flow rate and an initial pressure, the reagent comprising an alkaline aqueous solution having a pH of at least 7, the alkaline aqueous solution comprising a cation, a peroxide, and a chelating agent;
   treating the ground media for a time sufficient to have the chelating agent chelate the metal of the metal compound present in the ground media;
   reacting the chelated metal with the peroxide to catalytically convert the peroxide to oxidizing agents and hydroxide ions;
   contacting the reagent with the ground media in an amount sufficient to decrease its permeability;
   contacting the contaminants in the ground media with the hydroxide ions to convert the contaminants through nucleophilic substitution to environmentally safe, non-toxic compounds, comprising a gas;
   increasing the pressure of the reagent into the ground media, to diffuse the reagent further into the ground media, and to generate additional reaction;
   further reducing the permeability of the ground media, to release contaminants trapped therein;

transferring contaminants from the ground media to above a surface of the ground media through pressure transfer; and contacting the contaminants in the ground media with one or more cations to convert gases to environmentally safe, non-toxic compounds, comprising a solid within the ground media.

* * * * *